United States Patent [19]

Hoffman et al.

[11] 4,193,570
[45] Mar. 18, 1980

[54] ACTIVE NUTATION CONTROLLER

[75] Inventors: Henry C. Hoffman, Baltimore; James H. Donohue, Ellicott City, both of Md.

[73] Assignee: The United States of America as represented by the Administrator of the National Aeronautics and Space Administration, Washington, D.C.

[21] Appl. No.: 897,830

[22] Filed: Apr. 19, 1978

[51] Int. Cl.² ............................................. B64G 1/20
[52] U.S. Cl. .................................... 244/165; 244/170
[58] Field of Search ................... 74/5.5; 244/3.21, 3.2, 244/3.22, 165, 170; 318/648, 651; 364/432, 434, 453

[56] References Cited

U.S. PATENT DOCUMENTS

| | | | |
|---|---|---|---|
| 3,511,452 | 5/1970 | Smith et al. | 244/165 |
| 3,591,108 | 7/1971 | Perkel et al. | 244/165 |
| 3,643,897 | 2/1972 | Johnson, Jr. | 244/3.22 X |
| 3,984,071 | 10/1976 | Fleming | 364/434 X |
| 4,096,427 | 6/1978 | Rosen et al. | 244/170 X |

*Primary Examiner*—Barry L. Kelmachter
*Assistant Examiner*—Reinhard J. Eisenzopf
*Attorney, Agent, or Firm*—Robert D. Marchant; John R. Manning; John O. Tresansky

[57] ABSTRACT

An apparatus for controlling nutation motion in a spinning body, comprising an angular accelerometer having its input axis perpendicular to the spin axis of the body, a flywheel having an axis of rotation perpendicular to the axis of the accelerometer and to the spin axis of the body, and a motor for driving the flywheel to attenuate or build nutation. The motor is controlled by circuitry that monitors the output of the angular accelerometer and drives the motor clockwise or counterclockwise during predetermined nutation angles synchronized to the zero crossover points of the accelerometer signal and centered about the nutation peaks. In one embodiment, the motor drive is phased to damp nutation motion to zero for stabilization. To increase the noise immunity of the system, when the output of the accelerometer falls below a threshold level, the circuitry operates in an open loop, beat mode wherein data representing the last accelerometer signal that exceeded that threshold level is stored, and the motor drive is controlled by the stored data. In a second embodiment, the motor is controlled to supply a predetermined amount of nutation motion to a body undergoing testing on a spin table for energy dissipation evaluation. In each embodiment, the use of an angular accelerometer rather than a linear accelerometer or gyro to monitor nutation enables placement of the nutation control apparatus at any location relative to the spin axis of the body requiring only crude orientation and no calibration.

5 Claims, 9 Drawing Figures

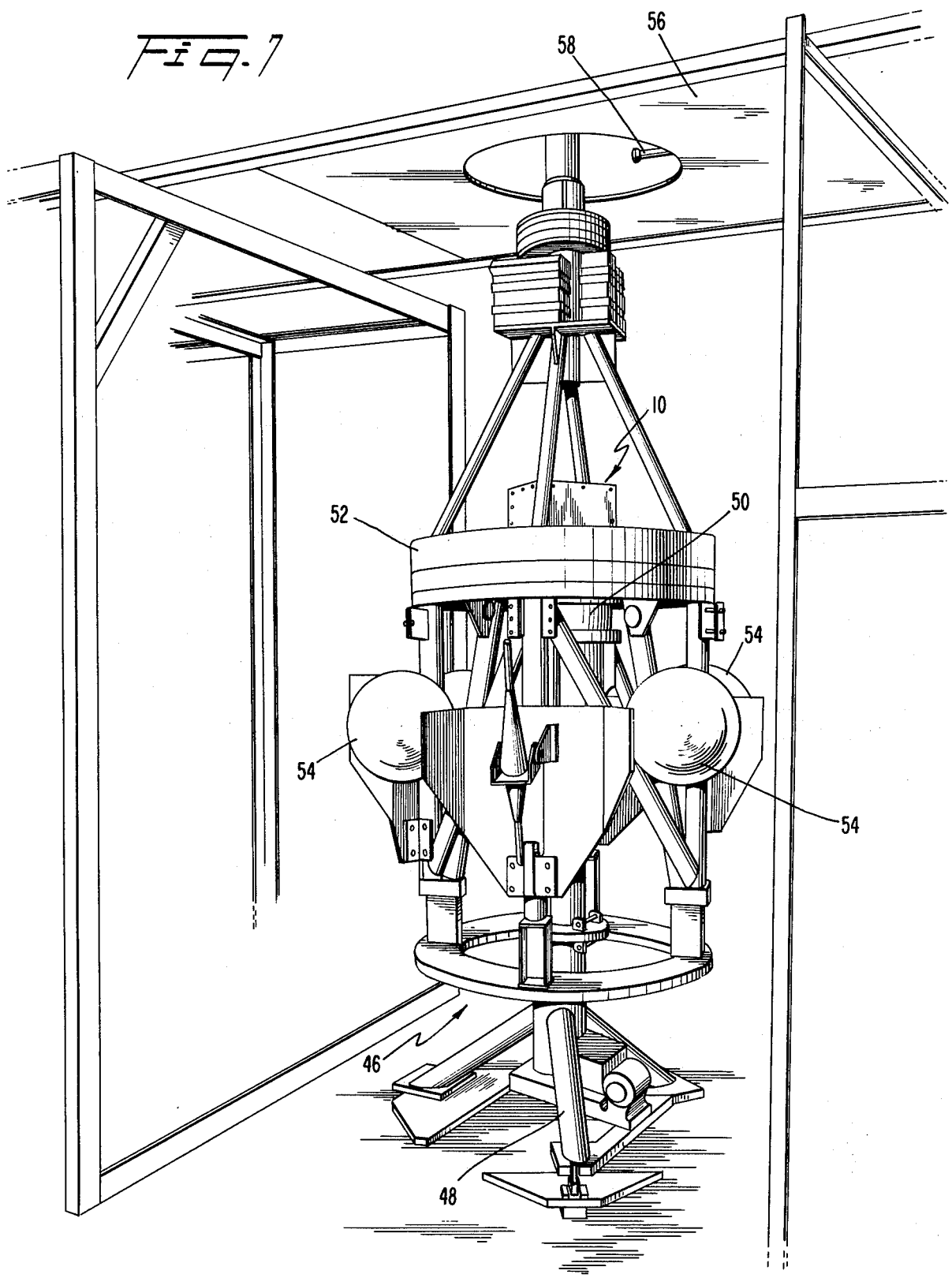

ACTIVE NUTATION CONTROLLER

ORIGIN OF THE INVENTION

The invention described herein was made by employees of the United States Government and may be manufactured and used by or for the Government for governmental purposes without the payment of any royalties thereon or therefor.

BRIEF SUMMARY OF THE INVENTION

The present invention relates generally to nutation motion control in spinning bodies, and more particularly to a method and apparatus using an angular accelerometer, wherein nutation motion in a spinning body is damped for spin stabilization or increased to a predetermined nutation angle for energy dissipation testing on a spin table.

In certain satellite operations, such as monitoring the earth for the purpose of developing and validating predictive models for earthquake hazard alleviation, ocean surface conditions and ocean circulation, satellites are launched into nearly circular, nearly polar orbits and tracked by measuring laser beam reflections from the surfaces of the satellites. Each satellite is typically launched into orbit by a launch vehicle that is sequentially separated into first, second and third stages, as required, to finally inject the satellite into a geo-synchronous orbit with spin. There is a tendency, particularly during launches using long coast periods after third stage separation prior to firing on apogee kick motor, for nutational instabilities to develop. These instabilities are not entirely predictable during ground testing due to uncertainties in the estimation of the energy dissipation characteristics of the satellite and launch vehicle during the long transfer orbit, caused particularly by uncertainties within the rubbery solid propellant of the apogee kick motor. An on-board system is therefore required for adding energy to the launch vehicle and satellite prior to establishing the final orbit to stabilize the satellite by eliminating nutation motion.

On-board active dampers have been used to attenuate nutation motion by developing a torque of opposite phase to that of the nutation torque using jets or a flywheel controlled in response to a linear accelerometer that monitors that nutation. Linear accelerometers, however, are sensitive to translational motion and thus precise alignment of the accelerometer with respect to the spin axis of the system is required.

As mentioned above, in order to maintain the upper stage of the spacecraft stable during flight, dissipated energy must be replaced by supplying to the assembly precisely the amount of energy dissipated for zero composite energy change. Prior to the launch of spacecraft, the upper stage is tested to determine energy dissipation during flight conditions. The upper stage is mounted on a spin table having a three-axis, gas bearing for "floating" the stage. Spin is imparted to the upper stage at a rate high enough to cause the stage to spin about a vertical nominal spin axis in a stable mode. As energy is dissipated due to sloshing of fuel in the fuel tanks, for example, nutation motion tends to develop causing the spacecraft assembly to spin about a maximum rotational moment of inertia axis that is displaced from the critical, nominal spin axis. The amount of energy dissipation can be calculated by monitoring the change in nutation angle of the spinning body as a function of time.

To calculate the amount of energy dissipation using the spin table technique, it is necessary to impart a predetermined initial nutation to the spinning assembly. In the past, the initial nutation has been developed in the spinning body by simply striking the body during spinning. Because the amount of nutation induced by striking is indeterminable, an initial nutation angle can be imparted only approximately by trial and error. Also, this method cannot be controlled automatically, as by a computer.

Accordingly, one object of the invention is to provide a means for accurately establishing an initial nutation angle in a spinning assembly on a spin table for calculating energy dissipation.

Another object is to provide a system for establishing an initial nutation angle during spin table testing, which is adaptable to computer control.

Yet another object is to provide a method of and apparatus for establishing an initial nutation angle in a spin table system using a sensing and control device that is positioned independent and therefore easily installed on an assembly being tested.

Still another object of the invention is to provide a new and improved apparatus for damping nutation motion in a spinning body.

Another object is to provide an active nutation damping apparatus, wherein the location of the nutation sensor is non-critical.

Still another object is to provide a new and improved active nutation damping apparatus that is self-contained and able to be located on-board along the spin axis or at any other convenient location without requiring precise, position dependent calibration.

Briefly, these and other disadvantages are overcome by providing a self-contained system for controlling nutation in a spinning body comprising an angular accelerometer having its input axis perpendicular to the spin axis of the body and a flywheel mounted adjacent the accelerometer with the axis of rotation of the flywheel perpendicular to the spin axis of the body as well as to the input axis of the accelerometer. A DC motor for rotating the flywheel is responsive to the output of the accelerometer and controlled by a control circuit to rotate the flywheel in proper directions and in synchronism to the nutation frequency to either damp nutation for flight stabilization or build nutation to establish an initial condition for spin table testing. The significance of using an angular accelerometer rather than a conventional, linear accelerometer, is that a package containing the accelerometer, flywheel, motor and control circuitry can be located directly along the spin axis of the assembly being stabilized or tested or at any other convenient location on the assembly without requiring position calibration. This enables greater versatility in layout during design of the assembly and eliminates the critical, accelerometer calibration step.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING

In the drawings where like parts are designated by the same references:

FIG. 4 is a block diagram showing the control circuit of the present invention;

FIG. 7 is a perspective view of a spin table incorporating the nutation control of the present invention to impart nutation for testing.

DESCRIPTION OF THE PREFERRED EMBODIMENT

Figure 1:
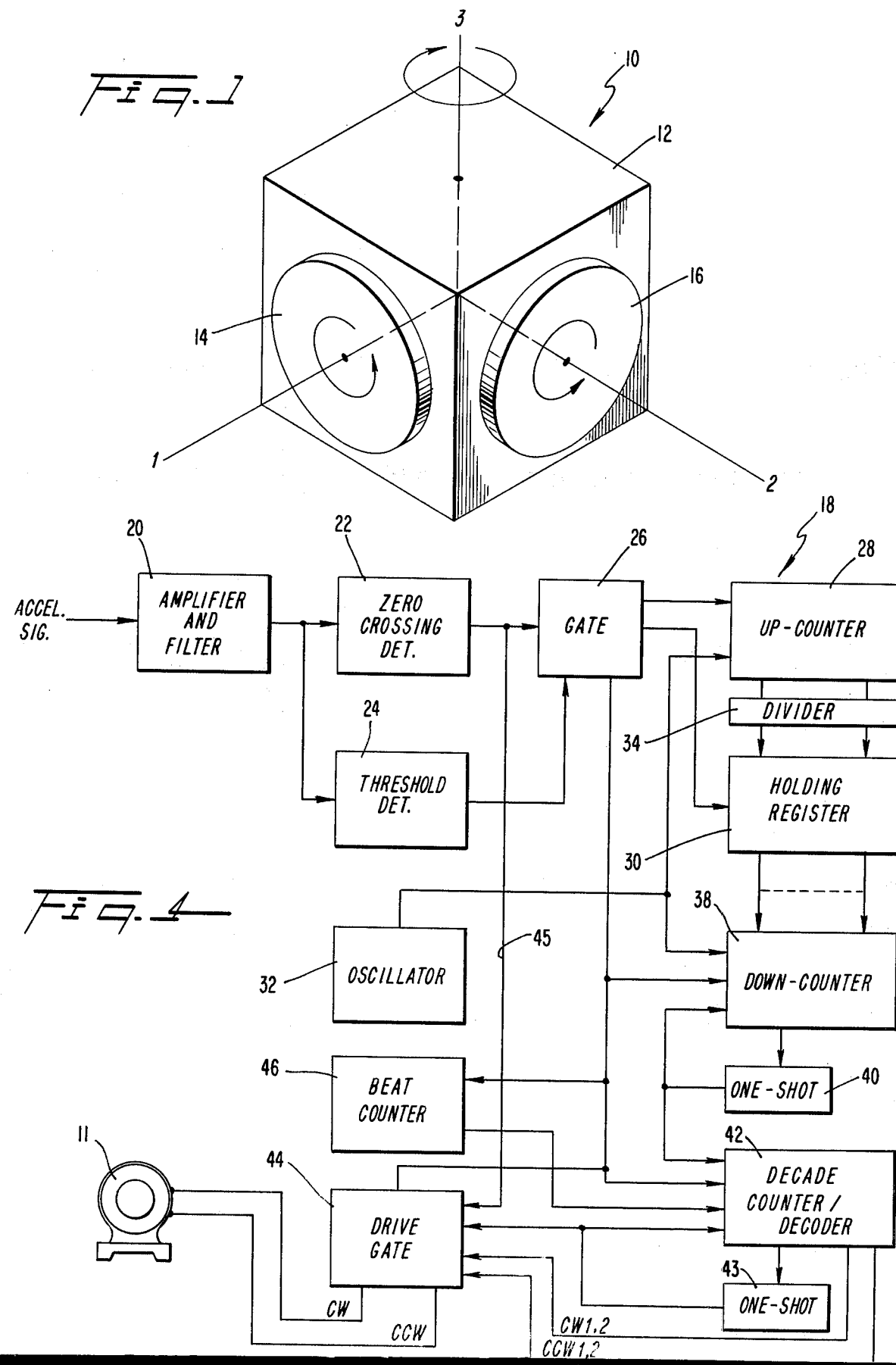
FIG. 1 is a perspective view of the nutation control device, in accordance with the invention, showing the angular accelerometer and flywheel, both perpendicular to the spin-axis.

Referring to FIG. 1, an active nutation controller 10, in accordance with the invention, comprises a housing 12 within which is located an angular accelerometer 14 and an inertia wheel or flywheel 16. Flywheel 16 is rotated by a DC, permanent magnet torque motor 11 (FIG. 4) in the housing that is adapted to be driven clockwise or counterclockwise in response to positive or negative drive signals. The housing 12 is shown positioned with its center of mass along the spin axis (coordinate axis 3) of a body (not shown) to be controlled. The input of the angular accelerometer 14 is positioned along the coordinate axis 1 and the flywheel 16 is positioned with its axis of rotation along coordinate axis 2. The coordinate axes 1, 2 and 3 are mutually orthogonal.

In accordance with the invention, nutation motion of a spinning body, such as a spacecraft, is controlled by monitoring nutation with angular accelerometer 14 to develop a nutation signal. The nutation signal is used to control rotation of flywheel 16 to thereby either attenuate nutation motion to zero for stabilization or build nutation to a predetermined initial condition for spin table testing. Of particular importance, because the accelerometer 14 is an angular accelerometer, such as the model 4590, manufactured by Systron Donner, Concord, California, the accelerometer is position independent, thus requiring no critical placement within the assembly being tested or controlled and further requiring no position dependent calibration. This is in contrast with conventional linear accelerometers and rate gyros which generate outputs that are functions of displacement from the spin axes as well as nutation magnitude and must be carefully calibrated during initial installation.

Figures 2, 3A, 3B, 3C:
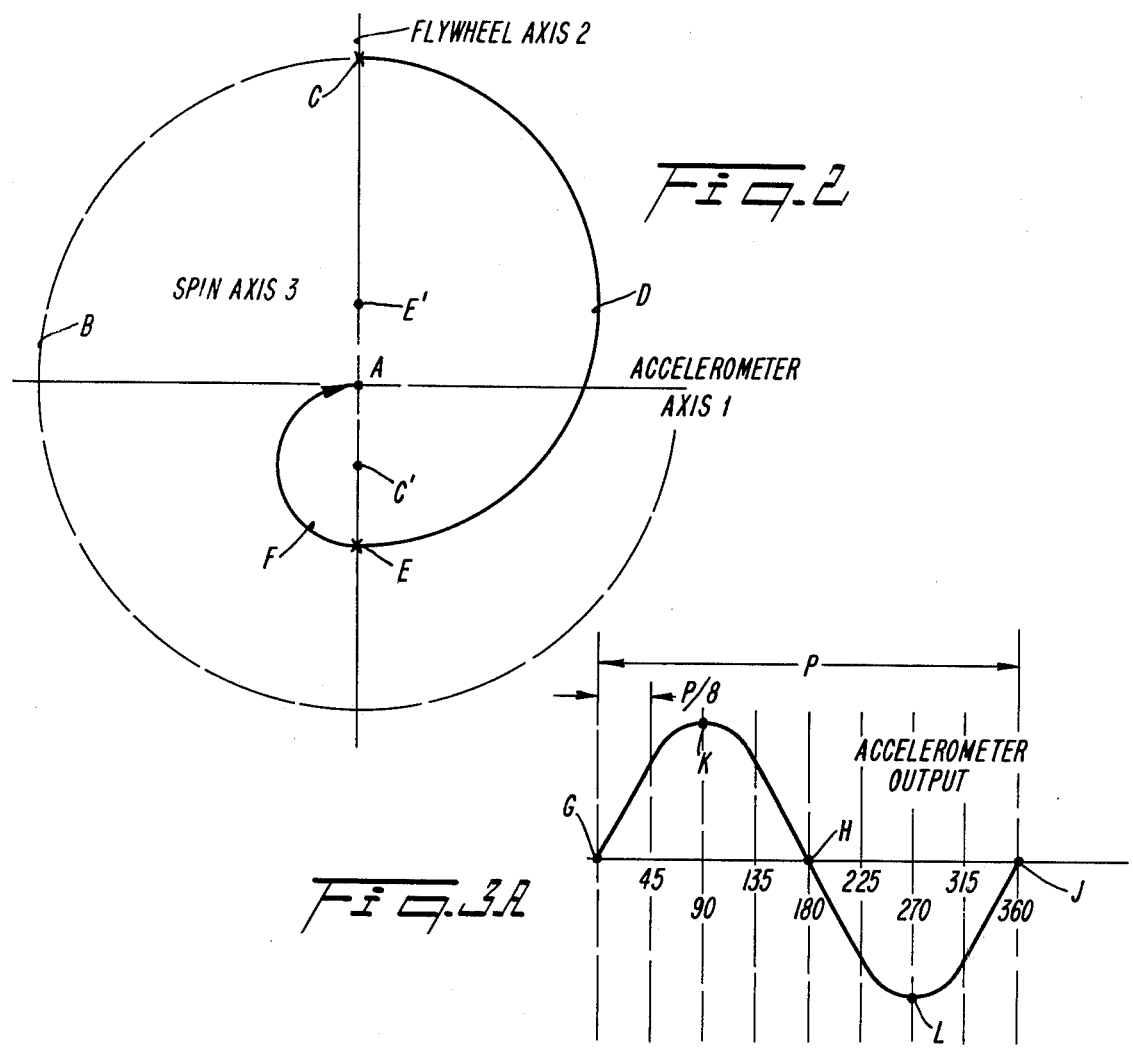
FIG. 2 is a graph showing the control strategy used in the present invention.
FIG. 3(a)–3(c) show typical accelerometer signal, motor drive signal and flywheel motion waveforms.

Also provided within housing 12 is an electronic control circuit 18 (FIG. 4) which controls drive of flywheel 16 in response to the output of the accelerometer 14. The control strategy developed by the circuit 18, termed "end-game control" is explained with reference to FIGS. 2 and 3. In FIG. 2, considering the end-game control strategy in a damping mode, for example, visualization is facilitated by the "angular momentum node"

concept. The angular momentum node is considered to be a point in the pitch/yaw plane about which the pitch/yaw component of the momentum rotates. The location of the node is controlled by applying an external torque to the body or, as in the preferred embodiment, by driving flywheel 16. When the flywheel is static, the angular momentum node is at the origin of the graph shown in FIG. 2, designated by the character A. The momentum vector is shifted downwardly when the flywheel 16 is rotated in one direction and is shifted upwardly when the flywheel is rotated in the opposite direction. In the example shown in FIG. 2, the initial nutation level of the spinning body corresponding to the initial momentum vector is identified by the character B. At character C, flywheel 16 is controlled to rotate in a direction tending to dampen nutation for ½ nutation cycle, causing the nutation angle to follow the trajectory centered about point E' and identified by character D. At character E, the flywheel 16 is now controlled to rotate in the opposite direction for ½ nutation cycle, causing a nutation trajectory to follow the trajectory F centered about point C' toward the origin, or spin axis, of the body (representing a nutation angle of zero).

The control strategy referred to above is verified from the Euler equations for the system which are:

$$A\dot{\omega}_1 + (C-A)\omega_3\omega_2 = I\sigma\omega_3 \quad (1)$$

$$A\dot{\omega}_2 - (C-A)\omega_3\omega_1 = -I\dot{\sigma} \quad (2)$$

$$C\dot{\omega}_3 = -I\sigma\omega_1 \quad (3)$$

The well known zeroth order (i.e. with I=0) solution of this set of equations is:

$$\omega_1 = \omega \cos \lambda t \quad (4)$$

$$\omega_2 = \omega \sin \lambda t \quad (5)$$

$$\omega_3 = \Omega \quad (6)$$

where $$\text{where } \lambda = \left(\frac{C}{A} - 1\right)\Omega$$

Now, in terms of angular momentum H and nutation angle θ, $$C\omega_3 = H \cos \theta \quad (7)$$

Substituting (7) into (3) produces $$H \sin \theta \dot{\theta} = I\sigma\omega_1 \quad (8)$$

Substituting now $\omega_1$ with its zero order solution (with $A\omega \simeq H \sin \theta$):

$$\dot{\theta} \simeq \frac{I}{A} \sigma \cos \lambda t \quad (9)$$

Assuming that the flywheel motor runs at a maximum speed of $\pm \sigma_0$, optimum nutation damping will by achieved if the motor is driven such that $$\sigma = -\sigma_0 \sin (\cos \lambda t) \quad (10)$$

Since the maximum average value of cos λt over one half nutation cycle is 2/π, the maximum achievable nutation decay rate will be $$\dot{\theta}_{opt} = -\frac{2}{\pi} \frac{I}{A} \sigma_0 \qquad (11)$$

Since the input axis of angular accelerometer 14 is aligned with coordinate axis 1 in FIG. 1, it is apparent that the accelerometer 14 will monitor the following quantity:

$$\text{Acceleration} = \dot{\omega}_1 \simeq -\omega\lambda \sin \lambda t \qquad (12)$$

Also, since the sign of motor speed must be opposite to the sign of cos λt, as indicated in equation (10), it is apparent that optimum motor switching must occur at the peaks of the accelerometer output. Referring to FIG. 3A, the sinusoidal output of the accelerometer is shown, including zero crossover points G, H and J as well as waveform peaks K and L. The optimum speed characteristic of flywheel 16 is shown in FIG. 3(c) in solid line, wherein direction change-over of the flywheel occurs at positive peak K and negative peak L of the accelerometer output waveform. The speed characteristic shown in FIG. 3(c) thus represents the optimized speed-time characteristic of flywheel 16 along a nutation period P defined as the time duration between zero cross-over points G and J in FIG. 3A.

Referring to FIG. 3(b), the optimum signal to be applied to drive flywheel 16 in the manner shown in FIG. 3(c) comprises a square wave, shown in dotted line, having a polarity reversal at each of the zero crossover points of the accelerometer output signal. In order to reduce power requirements for controlling nutation, however, we maintain the same control strategy as described above but reduce the duty cycle of the motor drive waveform to 50%. The reduced duty cycle waveform is shown in solid line in FIG. 3(b) and extends from a nutation angle of 45° to a nutation angle of 135° with one polarity and between 225° and 315° in the opposite polarity. We have determined that the 50% duty cycle waveform shown in solid line in FIG. 3(b) results in a nutation angle damping rate that is 70% of the optimum damping rate.

In practice, the speed characteristic of flywheel 16 is not a step function as shown in FIG. 3(c) due to flywheel inertia. The actual speed characteristic of the flywheel 16 is more accurately represented by the dotted line in FIG. 3(c). This means that the rate of nutation damping is somewhat slower than the optimum rate calculated from equation (11). The resultant damping, however, is adequate for all spacecraft stabilization or spin table testing applications that we have encountered.

The control strategy developed above (assuming a nutation damping mode of operation) is implemented by dividing each nutation period P into eight equal parts by generating synchronous pulses having a repitition rate that is eight times the nutation frequency. The pulses are used to synchronize flywheel drive to the positive and negative peaks of the accelerometer output signal waveform with each motor drive waveform being located symmetrically about an accelerometer signal waveform peak. The motor drive waveforms alternate in polarity, as shown in FIG. 3(b).

Referring to FIG. 4, a control circuit 18 for generating the flywheel drive waveforms of FIG. 3(b), is shown. The output of accelerometer 14 (FIG. 5(a)), which is a low level voltage signal, is applied to an amplifier and low pass filter 20 to amplify the accelerometer signal and remove high frequency, superimposed noise components. The output of the amplified and filtered accelerometer signal is supplied to a zero crossing detector 22 as well as to a threshold detector 24. The zero crossing detector 22 generates a positive pulse at each of the positive going, zero crossover points of the accelerometer waveform (see FIG. 5(c)), the duration of time between successive zero crossovers being defined as the nutation period P, as shown in FIG. 5(d).

Figure 5:
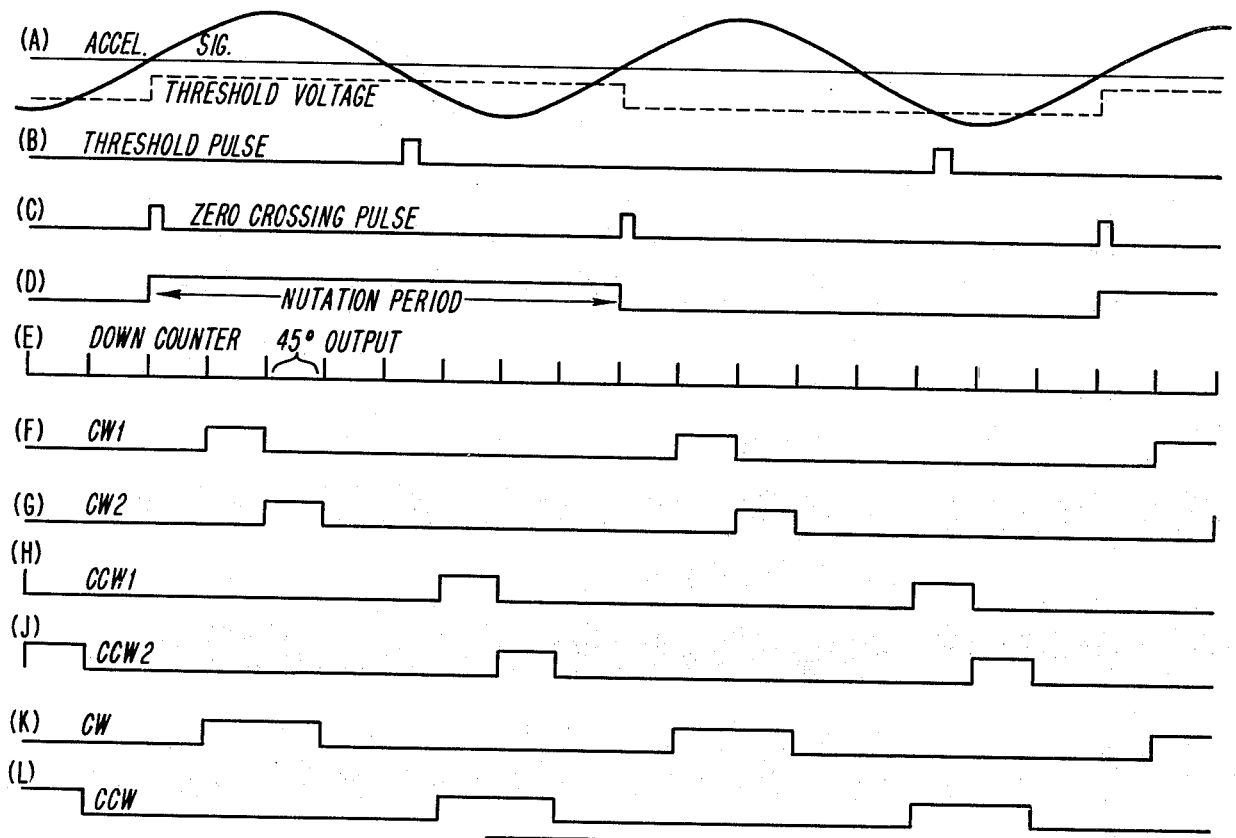
FIGS. 5(a)–5(l) are signal waveforms generated by the control circuit during closed loop operation.

Detector 24 generates a gating pulse (FIG. 5(b)) each time the magnitude of the accelerometer signal exceeds the magnitude of the threshold voltage. The generation of each gating pulse enables gate 26 to pass through the next successive incoming zero crossover pulse, as shown in FIGS. 5(a)–5(c). The output of zero crossing detector 22 is thus supplied through the gate circuit 26 containing conventional digital gating logic to the enable terminals of up-counter 28 and holding register 30. The gate circuit 26 thereby enables loading of counter 28 and register 30 only when the magnitude of the accelerometer signal exceeds the magnitude of the threshold voltage. This assures that flywheel 16 driven in response to the accelerometer signal and not in response to noise when the nutation magnitude is low, as described in more detail below.

Assuming first that the magnitude of the accelerometer signal exceeds the level of threshold detector 24, the length of the nutation period P, defined by successive zero crossing pulses, is monitored by up-counter 28. At the beginning of a measurement cycle, defined by a first zero crossing pulse (see FIG. 5(d)), the up-counter 28 is enabled by said pulse to receive and count free running pulses generated by an oscillator 32, the frequency of the oscillator being preferably, but not necessarily, 1.5 KHz. At the end of the measurement cycle, defined by the next zero crossing pulse, the input to up-counter 28 is disabled by the output of gate 26, the contents of counter 28 corresponding to the length of the nutation period P. Also in response to the second zero crossing pulse, the contents of the up-counter 28 are supplied to a divide by eight divider circuit 34 and then stored in holding register 30.

The signal stored in register 30 is a count corresponding to one eighth of the nutation period defined by the first and second zero crossover pulses, or 45°, and is up-dated on alternate nutation periods under control of gate 26, assuming the output of accelerometer 14 exceeds the threshold level. When the output of the accelerometer 14 drops below the threshold level, on the other hand, the holding register 30 retains the last entered data without up-date, as shall be discussed below.

The count in holding register 30, in response to the second zero crossing pulse, is transferred to down-counter 38. Counter 38 is down-clocked by the output of oscillator 32 to zero. When the down-counter 38 achieves a zero count, it generates a trigger pulse to trigger one shot circuit 40. The one shot 40, in turn, generates a single pulse back to down-counter 38 for resetting to an "all registers full" initial condition, and to decoder circuit 42.

In response to the pulse generated by one shot 40, decoder circuit 42 supplies a digital signal to motor drive gates 44 which drive flywheel 16 in one direction, e.g., clockwise. The pulse generated by one shot 40 corresponds to a nutation angle ($\theta$) of 45° (see FIG. 3(a)) whereat flywheel drive is initiated according to the control strategy shown in FIG. 3(b) by supplying a drive pulse to motor 11.

The down-counter 38, having been reset by the output of one shot 40, is again clocked to zero count by oscillator 32, and this occurs at 90° of nutation phase travel from the previous zero crossing. One shot circuit 40 thus generates a second trigger pulse at $\theta = 90°$ which is supplied to again reset down-counter 38 and to advance decoder 42. Since the control strategy shown in FIG. 3(b) calls for a second 45° interval of flywheel rotation in the clockwise direction, the output of decoder 42 is programmed to control motor drive gates 44 to continue to drive flywheel 16 in a clockwise direction.

The next successive pulse generated by one shot 40, corresponding to another 45° of nutation phase travel, or a total phase travel of 135° from the previous zero crossing, commands turn-off of the motor 11, in accordance with the control strategy of FIG. 3(b). The decoder 42 is thus programmed to control drive gates 44 to provide zero rotation of the flywheel 16 by de-energizing the flywheel drive motor 11.

The successive pulses generated by one shot 40, corresponding, respectively, to 180°, 225°, 270°, 315° and 360° of nutation phase travel supplied to decoder 42 cause the decoder to control drive gates 44 for the following operations satisfying the control strategy of FIG. 3(b): off, counterclockwise, clockwise, off, off. The motor drive waveforms components are shown in FIGS. 5(f)-5(j), the composite drive waveforms being shown in FIGS. 5(b) and 5(l).

Following generation of the eighth pulse by one shot 40, corresponding to $\theta = 360°$ of nutation phase travel from the previous zero crossing (one complete nutation cycle), the contents of holding register 30 are updated, by up-counter 28 under the control of gate 26, assuming the magnitude of the accelerometer signal exceeds the threshold level. Also at $\theta = 360°$, one shot circuit 43 is controlled by decoder 42 to generate a trigger pulse for resetting the decoder for another full cycle of drive motor control.

As discussed with respect to FIG. 2, in a nutation damping mode of operation, each cycle of operation of the flywheel 16 causes the nutation motion of the rotating object to approach zero. As long as the magnitude of the accelerometer signal is greater than the threshold level, the contents of the holding register 30 are updated after each nutation cycle and counted down to zero in down-counter 38 for control of flywheel 16. When the magnitude of the accelerometer voltage is below the threshold level, however, occuring during low nutation motion, the output of the zero crossing detector 22 is inhibited by gate 26. The contents of holding register 30, which control timing of motor drive gates 44, are no longer responsive to changes in nutation frequency.

When the accelerometer signal has a magnitude that is slightly less than the magnitude of the threshold level, spurious noise may be generated in excess of the threshold level, thus initiating the measurement of a nutation period. However, the period measurement would not be completed at the proper time because the accelerometer signal will probably not exceed the same threshold level on the next cycle. To always assure a proper period measurement following turn-on in response to noise, the level of the threshold voltage is changed in synchronism with the accelerometer signal, as shown in FIG. 5(a) in dotted line. We have found that the cyclically varying threshold level, shown in dotted line in FIG. 5(a), assures proper period measurement thus assuring proper drive to flywheel 16 in a noisy environment even during very low accelerometer signal output levels.

To prevent any possible generation of motor drive pulses by drive gates 44 that are 180° out of phase with the accelerometer 14 signal due to some uncertainties in closed loop signal processing that we have experienced, the drive gates 44 receive zero-crossover sync pulses from zero crossing detector 22. The zero crossing pulses, generated by detector 22, correspond only to positive-going zero crossovers of the accelerometer signals. The pulses are used to assure that the corresponding, or positive zero crossover synchronized ones, of the drive waveforms generated by gates 44 are either positive for clockwise flywheel rotation or negative for counterclockwise rotation, depending upon whether nutation damping or build up is required.

When the accelerometer signal magnitude is below the threshold level, the magnitude of the nutation angle is low but greater than zero. In order to further reduce the nutation angle to zero, in accordance with the invention, the down-counter is controlled by a beat counter 46 to continue to down-count to zero a predetermined number of times in an open-loop mode of operation. The initial count supplied to down-counter 38 at the beginning of each count down period is the count maintained in holding register 30. This count corresponds to the nutation period P sensed by accelerometer 14 the last time the magnitude of the accelerometer signal was above the threshold level. The number of times that down-counter 38 is enabled to down-count and thereby continue to cause drive gates 44 to generate flywheel motor control signals is preset in the beat counter 46. In practice, we preset the beat counter to eight requiring cycling of the flywheel 16 over eight full nutation cycles to reduce nutation angle to zero after the magnitude of the accelerometer signal has dropped below the threshold level.

The operation of beat counter 46 is illustrated in the waveforms of FIGS. 6A–6J. The accelerometer signal shown in FIG. 6A has a magnitude that is decreasing as a function of time indicating nutation damping. At point H on the accelerometer waveform, the magnitude of the signal is lower than the threshold voltage level (dotted line). Zero crossing pulses (FIG. 6B) are no longer supplied to up-counter 28 through gate 26 which is disabled by the output threshold detector 24. The holding register 30 thus retains the last up-dated nutation period count. This count is repetitively down-counted in down-counter 38 to continue to supply pulses (FIG. 6(A)) to decoder 42 which controls drive gates 44 to generate the clockwise and counterclockwise motor drive signal waveforms shown in FIGS. 6E and 6F. Decoder 42 is automatically reset following each nutation cycle by a trigger pulse generated by the one-shot circuit 43 (see FIG. 6(A)).

Figure 6:
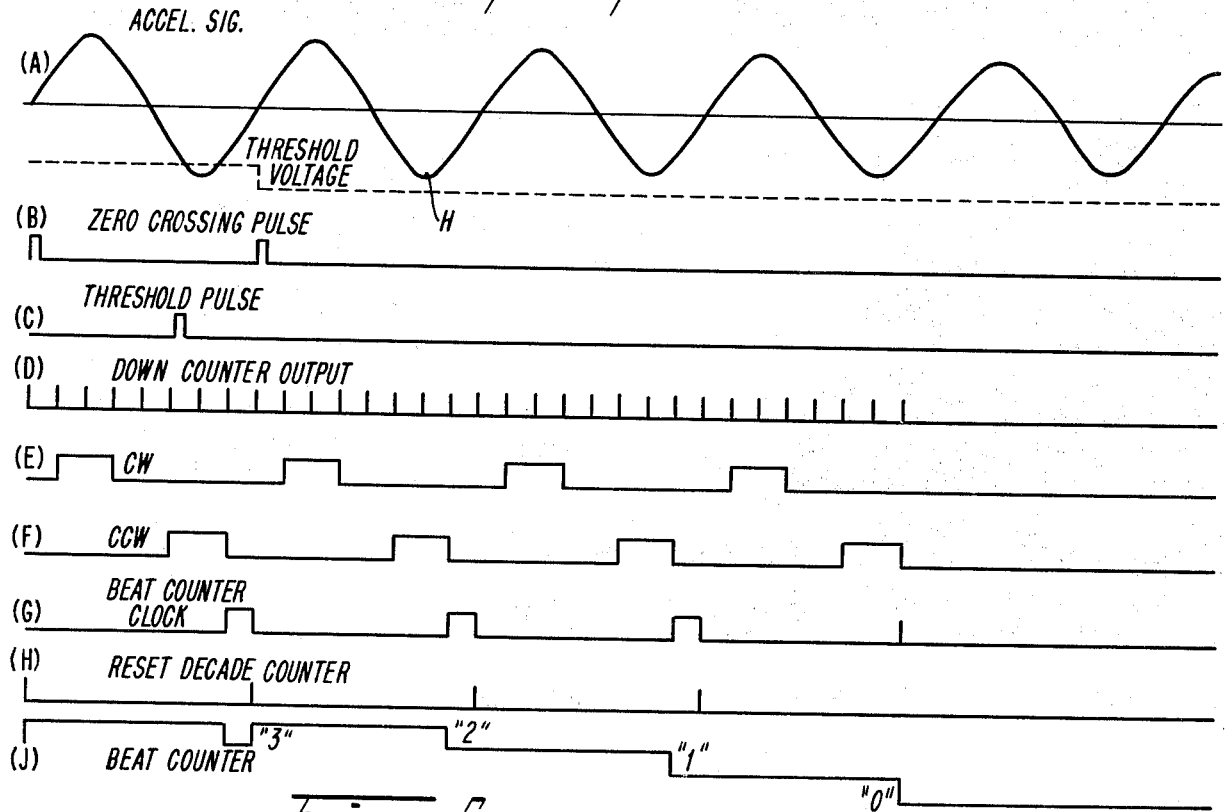
FIGS. 6(a)–6(j) are signal waveforms generated by the control circuit in the open loop, beat mode of operation.

The beat counter 46 is preset to a three count, as shown in the example of FIG. 6J. Upon reaching the zero count, as shown, the beat counter 46 inhibits the output of decoder 42 to terminate generation of the motor drive signals by drive gates 44. The circuit 18 now remains dormant until the accelerometer signal again exceeds the threshold voltage for reinitiation.

The circuit 18, during the open-loop mode of operation under the control of beat counter 46, thus continues to attenuate damping toward zero independently of the output of the accelerometer 14. The frequency of operation of flywheel 16 is therefore synchronized to the last nutation period during which the accelerometer signal magnitude exceeded the threshold voltage. Although there may be some phase error involved if there is subsequent change in the period of subsequent nutation cycles, the error in practice is very small. We have found that no undesirable phase reversal of drive signal relative to accelerometer signal occurs in the open-loop, beat mode of operation. Accordingly, no zero crossover sync pulses are supplied by detector 22 to drive gates 44 along line 45.

Although a typical application of the system described above is in nutation damping for spacecraft stabilization, the system could also be used to set up an initial nutation angle on a conventional spin table for monitoring energy dissipation of spacecraft assemblies. Referring to FIG. 7, a conventional spin table 46 is supported on a tripod 48 and includes a three-axis, air bearing 50 upon which is mounted a spacecraft assembly 52, such as a spinning upper stage, having fuel tanks 54. The tanks 54 contain a solid, rubbery propellant that tends to slosh about during flight, continuously dissipating energy. The rate of energy dissipation must be predetermined in order to calculate the amount of energy that must be added to the assembly during flight to maintain flight stability.

The active nutation controller 10, in accordance with the invention, is located on the assembly 52 in any convenient location, such as on the spin-axis, as shown. The flywheel 16 is phased oppositely to the phasing provided in a nutation damping mode of operation in order to build nutation in the assembly 52 to a predetermined nutation angle, the nutation angle being subsequently monitored as a function of time to determine energy dissipation rate. In operation, the assembly 52 is caused to rotate on bearing 50 at a relatively high rate of rotation so that the assembly contains sufficient energy to maintain a stable, vertical spin axis. As the speed of rotation of the assembly increases from zero, the upper end of the assembly is maintained vertically aligned by a releasable bearing mechanism (not shown) above roof 56. The bearing is released when the speed of rotation of the body is high enough to provide a stable spin condition of the assembly 52 undergoing testing.

The flywheel 16 within controller 10 is controlled by the output of accelerometer 14 and by a computer monitor (not shown) to induce an initial nutation in the assembly, the top of the assembly being free to nutate within the aperture in roof unit 56. The magnitude of the nutation motion may be monitored by the computer using conventional optics 58 for energy dissipation calculation.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A system for controlling nutation in a spinning body, comprising:
    a flywheel having an axis of rotation perpendicular to the nominal spin axis of said body;
    motor means for rotating said flywheel;
    an angular accelerometer having an input axis perpendicular to the spin axis of said body and to the axis of rotation of said flywheel;
    means for monitoring an output signal generated by said angular accelerometer, said monitoring means including;
        means for generating an accelerometer threshold voltage, and
        means for comparing said accelerometer output signal with said threshold voltage;
    means for detecting zero crossover points of said accelerometer output signal;
    means for detecting predetermined portions of positive and negative half cycles of said accelerometer output signal, said predetermined detecting means and said zero crossover points detecting means being operative only when said comparing means indicates that said accelerometer output signal is greater than said threshold voltage; and
    means responsive to said last two means for controlling said motor means to selectively damp or build nutation.

2. The system of claim 1, wherein said motor means includes means for rotating said flywheel in a direction tending to damp nutation in the spinning body.

3. The system of claim 1, wherein said motor means includes means for rotating said flywheel in a direction tending to build nutation in the spinning body.

4. The system of claim 1, wherein said angular accelerometer is located on the spin axis of said spinning body.

5. The system of claim 1, including storage means for storing zero crossover point synchronized data controlled by a zero crossover points generating means; and means for generating said stored data for controlling said motor when said accelerometer output signal is less than said threshold voltage.

* * * * *